United States Patent
Kowalchuk

(10) Patent No.: US 8,893,630 B2
(45) Date of Patent: Nov. 25, 2014

(54) SYSTEM FOR CONTROLLING AIR FLOW WITHIN AN AGRICULTURAL PRODUCT METERING SYSTEM

(75) Inventor: Trevor Lawrence Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 231 days.

(21) Appl. No.: 13/248,661

(22) Filed: Sep. 29, 2011

(65) Prior Publication Data
US 2013/0085598 A1 Apr. 4, 2013

(51) Int. Cl.
A01C 7/08 (2006.01)
A01C 7/20 (2006.01)
B65G 53/04 (2006.01)
A01C 7/10 (2006.01)

(52) U.S. Cl.
CPC .............. *A01C 7/081* (2013.01); *A01C 7/102* (2013.01)
USPC ........................................... 111/174

(58) Field of Classification Search
CPC ................................. A01C 7/081; A01C 7/102
USPC ........................................... 111/174
See application file for complete search history.

(56) References Cited

U.S. PATENT DOCUMENTS

| | | | |
|---|---|---|---|
| 4,159,064 A | 6/1979 | Hood | |
| 5,996,516 A | 12/1999 | Benneweis et al. | |
| 6,024,035 A | 2/2000 | Flamme | |
| 6,070,538 A | 6/2000 | Flamme et al. | |
| 6,079,340 A | 6/2000 | Flamme et al. | |
| 6,158,363 A | 12/2000 | Memory et al. | |
| 6,182,588 B1 | 2/2001 | Bodie et al. | |
| 6,192,813 B1 | 2/2001 | Memory et al. | |
| 6,584,920 B1 | 7/2003 | Cresswell | |
| 6,615,755 B2 | 9/2003 | Moszoro | |

FOREIGN PATENT DOCUMENTS

DE 102004025758 A1 12/2005

OTHER PUBLICATIONS

International Search Report and Written Opinion mailed Feb. 6, 2013 in PCT/IB2012/055072 filed Sep. 24, 2012.
PCT International Preliminary Report on Patentability dated Apr. 10, 2014.

*Primary Examiner* — Christopher J Novosad
(74) *Attorney, Agent, or Firm* — Rebecca L. Henkel

(57) ABSTRACT

A system for controlling air flow within an agricultural product metering system is provided. One system for distributing an agricultural product includes an air conveyance system having a blower configured to provide an air stream for moving metered product toward a distribution device. The air conveyance system is mounted on an air cart. The system also includes control circuitry mounted on an agricultural vehicle, and configured to adjust a speed of the blower based at least partially on a product flow rate from the air cart.

19 Claims, 4 Drawing Sheets

SYSTEM FOR CONTROLLING AIR FLOW WITHIN AN AGRICULTURAL PRODUCT METERING SYSTEM

BACKGROUND

The invention relates generally to agricultural product metering systems and, more particularly, to a system for controlling air flow within an agricultural product metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver agricultural product (e.g., seeds, fertilizer, etc.) to ground engaging tools within the seeding implement. Certain air carts include a metering system and an air conveyance system configured to deliver metered quantities of product into an airflow that transfers the product to the openers. However, typical air conveyance systems have limited ability to regulate air flow based on a product flow rate from the metering system. For example, in certain air conveyance systems, the fan speed is manually set by an operator. In such configurations, the fan remains at a fixed speed unless adjusted by the operator. Unfortunately, the fixed fan speed may provide an insufficient air flow to the metering system, thereby increasing the possibility of blockage formation within product distribution hoses. Alternatively, the fixed fan speed may provide an excessive air flow to the metering system, thereby increasing the possibility of product being blown out of a seeding trench.

BRIEF DESCRIPTION

In one embodiment, a system for distributing an agricultural product includes an air conveyance system having a blower configured to provide an air stream for moving metered product toward a distribution device. The air conveyance system is mounted on an air cart. The system also includes control circuitry mounted on an agricultural vehicle, and configured to adjust a speed of the blower based at least partially on a product flow rate from the air cart.

In another embodiment, an agricultural vehicle system includes a hydraulics controller mounted on an agricultural vehicle. The hydraulics controller is configured to receive a signal indicative of a product flow rate from an air cart, and to determine a desired fan motor speed based at least partially on the signal. The system also includes a flow control device mounted on the agricultural vehicle. The flow control device is communicatively coupled to the hydraulics controller, and configured to control a flow of hydraulic fluid to a fan motor on the air cart based on the desired fan motor speed.

In another embodiment, a system for distributing an agricultural product includes a hydraulics controller configured to receive a first signal indicative of a ground speed of an air cart, and a second signal indicative of a desired product flow rate. The hydraulics controller is configured to determine a desired fan motor speed based at least partially on the first signal, and the second signal. The system also includes a fan motor mounted on the air cart, and configured to provide an air stream for moving metered product toward a distribution device. The system includes a flow control device communicatively coupled to the hydraulics controller. The flow control device is configured to control a flow of hydraulic fluid to the fan motor based on the desired fan motor speed and the flow control device is mounted on an agricultural vehicle configured to tow the air cart.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
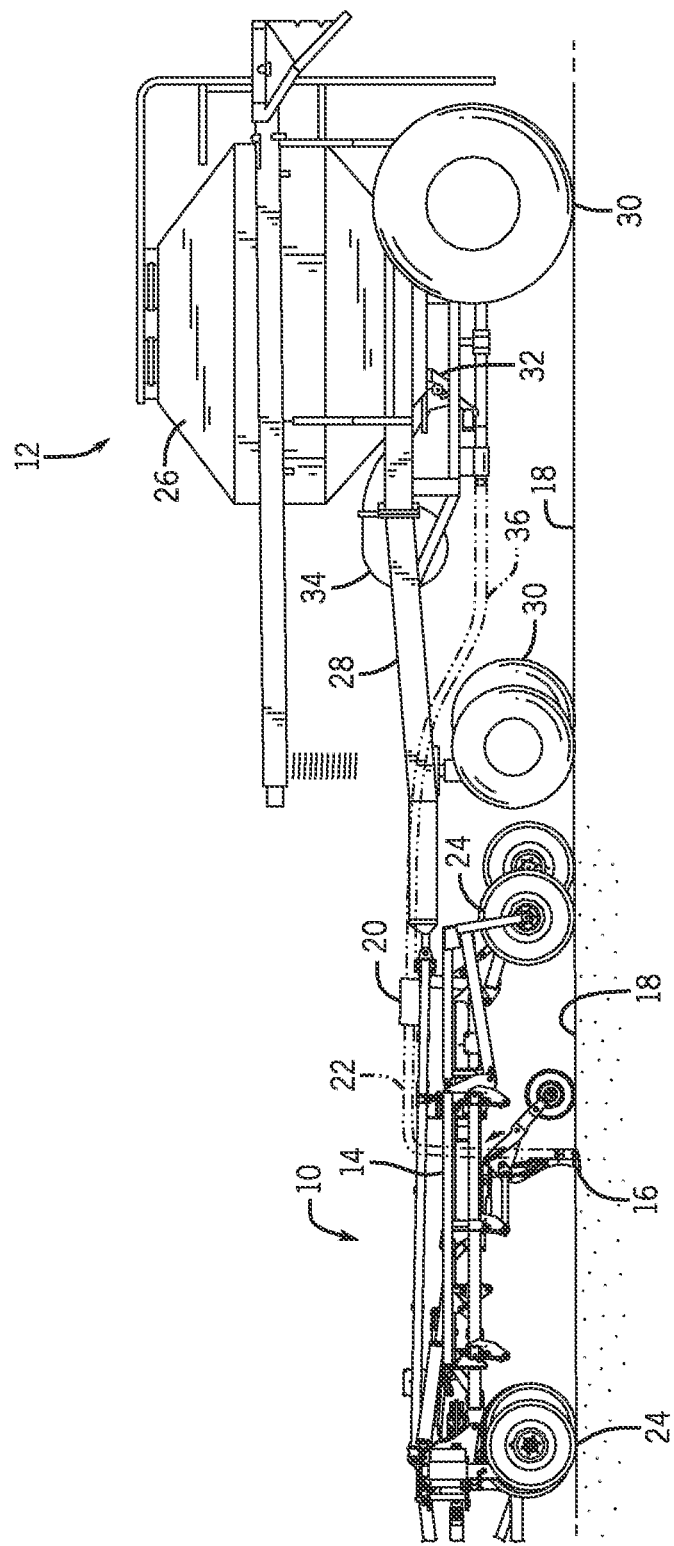
FIG. 1 is a side view of an air cart having an air conveyance system for moving metered product.

FIG. 1 is a side view of an air cart having an air conveyance system for moving metered product. In the illustrated embodiment, an implement 10 is coupled to an air cart 12, which is towed behind the implement 10 during operation and transport. The implement 10 includes a tool frame 14, and a ground engaging tool 16 coupled to the tool frame 14. The ground engaging tool 16 is configured to excavate a trench into the soil 18 to facilitate seed and/or fertilizer deposition. In the illustrated embodiment, the ground engaging tool 16 receives product (e.g., seed, fertilizer, etc.) from a product distribution header 20 via a hose 22 extending between the header 20 and the ground engaging tool 16. Although only one ground engaging tool 16, product distribution header 20, and hose 22 are employed within the illustrated embodiment, it should be appreciated that the implement 10 may include additional tools 16, headers 20 and/or hoses 22 in alternative embodiments to facilitate product delivery across a wide swath of soil 18. In addition, the implement 10 includes wheel assemblies 24 which contact the soil surface 18 and enable the implement 10 to be pulled by a tow vehicle.

While the air cart 12 is towed behind the implement 10 in the illustrated embodiment, it should be appreciated that the air cart 12 may be towed directly behind a tow vehicle in alternative embodiments. For example, the air cart may be coupled to the tow vehicle by a hitch assembly, and the implement 10 may be towed behind the air cart 12. In further embodiments, the implement 10 and the air cart 12 may be part of a single unit that is towed behind a tow vehicle, or elements of a self-propelled vehicle configured to distribute product across a field.

In the illustrated embodiment, the air cart 12 includes a storage tank 26, a frame 28, wheels 30, a metering system 32, and an air source 34. The frame 28 includes a towing hitch configured to couple to the implement 10 or tow vehicle, thereby enabling the air cart 12 to be towed across a field. In certain configurations, the storage tank 26 includes multiple compartments for storing various flowable particulate materials. For example, one compartment may include seeds, and another compartment may include a dry/granular fertilizer. In such configurations, the air cart 12 may be configured to deliver both seed and fertilizer to the implement 10 via separate distribution systems, or as a mixture through a single distribution system.

The seed and/or fertilizer within the storage tank 26 are gravity fed into the metering system 32, thereby enabling the metering system to distribute a desired quantity of product to the ground engaging tools 16 of the implement 10. In the present embodiment, the metering system 32 includes sectioned meter rollers to regulate the flow of product from the storage tank 26 into an air flow provided by the air source 34. The air flow then carries the product through a hose 36 to the implement 10, thereby supplying the ground engagement tools 16 with seed and/or fertilizer for deposition into the soil. Although only one hose 36 is included in the illustrated embodiment, additional hoses may be may be employed in alternative embodiments to transfer product from the air cart 12 to various distribution headers 20 of the implement 10.

A control assembly may be communicatively coupled to the metering system 32 and the air source 34 to regulate flow of product to the implement 10. The control assembly may include a position sensing device, such as a Global Positioning System (GPS) receiver, a ground speed sensor, and/or an air flow sensor. In such configurations, the control assembly may receive geographical position information from the GPS receiver, thereby facilitating position determination of the air cart 12. As such, the control assembly may implement "Smart Farming" whereby the metering system 32 is controlled based on the geographical position of the metering system 32, air cart 12, and/or implement 10. Further, the control assembly may monitor a ground speed measured by the ground speed sensor for controlling the air flow rate. As may be appreciated, the air flow rate may be based on the ground speed (e.g., ground speed of the implement 10) and a desired product flow rate. The control assembly adjusts the air flow rate based on the product flow rate to provide sufficient air flow to substantially reduce the possibility of blockage formation within the product distribution hoses. In addition, the air flow rate may be limited to substantially reduce the possibility of product being blown out of a seeding trench. Further, the air flow sensor may monitor the actual air flow rate from the air source 34. The control assembly may then adjust the actual air flow rate to substantially correspond to the desired air flow rate.

Figure 2:
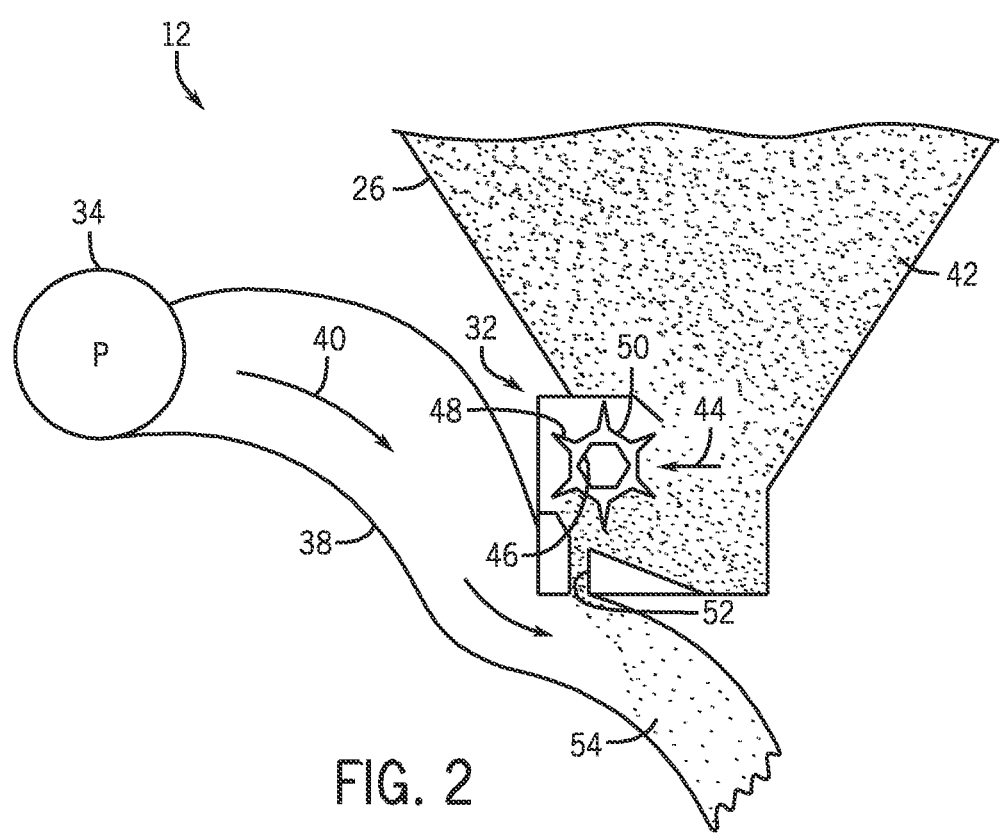
FIG. 2 is a schematic diagram of an exemplary air conveyance system which may be employed within the air cart of FIG. 1.

FIG. 2 is a schematic diagram of an exemplary air conveyance system which may be employed within the air cart 12 of FIG. 1. As illustrated, the air source 34 is coupled to a conduit 38 extending to the hose 36, and configured to flow air 40 past the metering system 32. In other embodiments, the conduit 38 may include multiple conduit sections with one conduit section coupling the air source 34 to the top of the metering system 32 and another conduit section coupling the bottom of the metering system 32 to the implement. In such a configuration, air 40 flows through the metering system 32, from top to bottom. The air 40 enters the metering system 32, combines with the metered product, and exits the metering system 32 as a mixture of product and air.

The air source 34 may be a pump or blower powered by an electric or hydraulic motor, for example. Specifically, in certain embodiments, the air source 34 may be a blower having a hydraulically controlled fan. Flowable particulate material 42 (e.g., seeds, fertilizer, etc.) within the storage tank 26 flows by gravity into the metering system 32. The metering system 32 includes one or more meter rollers 44 configured to regulate the flow of product 42 into the air flow 40. In certain embodiments, the metering system 32 may include multiple meter rollers 44 disposed adjacent to one another along a longitudinal axis of the rollers 44. In other embodiments, the meter rollers 44 may be positioned so their rotational axes are parallel to one another. For example, certain metering systems 32 include eight meter rollers 44 arrange in a linear configuration. Such systems 32 are known as "8-run" metering assemblies. However, alternative embodiments may include more or fewer meter rollers 44, e.g., 5, 6, 7, 8, 9, or more.

Each meter roller 44 includes an interior passage/cavity 46 configured to receive a shaft that drives the meter roller 44 to rotate. In the illustrated embodiment, the cavity 46 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 44. Alternatively, the meter rollers 44 may be coupled to a wheel by a gear assembly such that rotation of the wheel drives the meter rollers to rotate. Such a configuration automatically varies the rotation rate of the meter rollers based on the speed of the air cart.

Each meter roller 44 also includes multiple ridges 48 and flutes 50. The number and geometry of the flutes 50 are particularly configured to accommodate the material 42 being distributed. The illustrated embodiment includes six flutes 50 and a corresponding number of ridges 48. Alternative embodiments may include more or fewer flutes 50 and/or ridges 48. For example, the meter roller 44 may include 2, 4, 6, 8, 10, 12, 14, 16, 18, 20, or more flutes 50 and/or ridges 48. In addition, the depth of the flutes 50 and/or the height of the ridges 48 are configured to accommodate the material 42 within the storage tank 26. For example, a meter roller 44 having deeper flutes 50 and fewer ridges 48 may be employed for larger seeds, while a meter roller 44 having shallower flutes 50 and more ridges 48 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 44 controls the flow of material 42 into the air stream 40. Specifically, as the meter roller 44 rotates, material is transferred through an opening 52 in the metering system 32 into the conduit 38. The material then mixes with air from the air source 34, thereby forming an air/material mixture 54. The mixture then flows to the row units of the implement 10 via the pneumatic conduits, where the seeds and/or fertilizer are deposited within the soil. The rate that the product flows through the conduit 38 is controlled by the air source 34. Specifically, the air source 34 may increase the flow rate of the air stream 40, and thereby increase the flow rate of the air/material mixture 54. Further, the air source 34 may decrease the flow rate of the air stream 40, and thereby decrease the flow rate of the air/material mixture 54. For example, in applications where the air cart 12 increases speed, it may be desirable to increase the flow rate of the air/material mixture 54 being delivered to the implement 10. As another example, in applications where the product flow rate decreases, it may be desirable to decrease the flow rate of the air/material mixture 54 being delivered to the implement 10.

As discussed in greater detail below, a hydraulics controller may receive a signal indicating a desired product flow rate and a signal indicating the ground speed of the air cart 12. The hydraulics controller may use these signals to determine a desired fan motor speed (e.g., to control the flow rate from the air source 34). Further, the hydraulics controller may instruct a flow control device (e.g., a hydraulic valve or fan pump) to provide hydraulic fluid to the air source 34 to control its fan motor speed.

Figure 3:
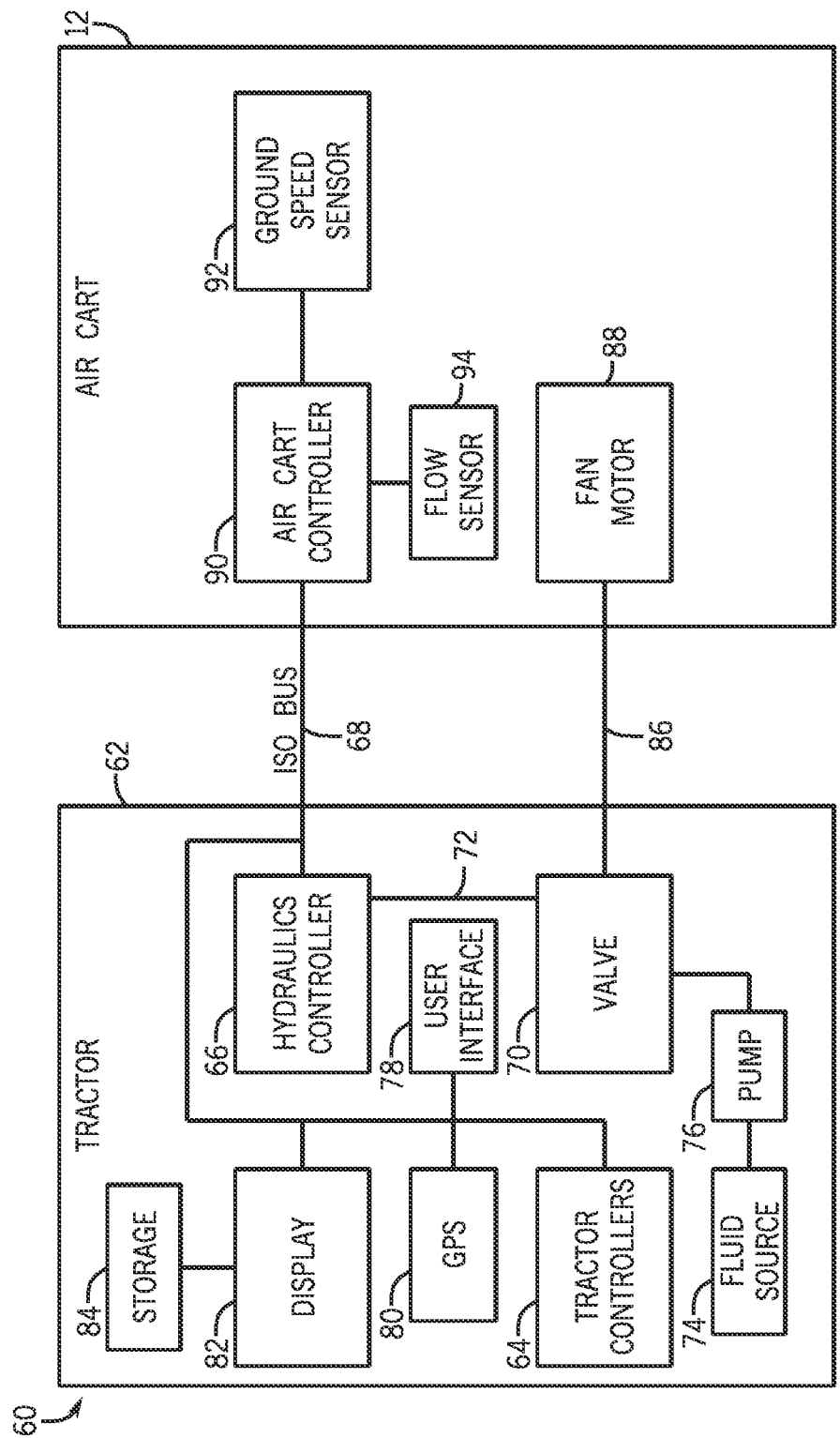
FIG. 3 is a schematic diagram of an embodiment of a system for distributing agricultural product in a field.

FIG. 3 is a schematic diagram of an embodiment of a system 60 for distributing agricultural product in a field. The system 60 includes a tow vehicle, such as the illustrated tractor 62, and an air cart 12. Further, the tractor 62 includes various tractor controllers 64 and a hydraulics controller 66 communicatively coupled to one another, and configured to communicate with the air cart 12 over an ISOBUS 68. The tractor controllers 64 control a variety of tractor functions, such as the engine, brakes, transmission, and so forth. The hydraulics controller 66 is configured to control the flow of hydraulic fluid throughout the system 60. For example, the hydraulics controller 66 may be configured to adjust fluid flow to various hydraulic actuators on the implement 10, the air cart 12, and/or the tractor 62. In the illustrated embodiment, the hydraulics controller 66 is communicatively coupled to a hydraulic valve 70 via an interface 72 (e.g., CAN bus, ISOBUS, etc.).

The valve 70 (e.g., proportional control valve) controls the flow of hydraulic fluid to the air cart 12. In particular, hydraulic fluid from a fluid source 74 is pumped by a pump 76 to the valve 70. When the hydraulics controller 66 instructs the valve 70 to open, the hydraulic fluid from the pump 76 flows through the valve 70. Conversely, when the hydraulics controller 66 instructs the valve 70 to close, the flow of hydraulic fluid through the valve 70 is blocked. It should be noted that the valve 70 may also be transitioned to a partially open position, thereby enabling the hydraulics controller 66 to further control the flow of hydraulic fluid to the air cart 12.

In the illustrated embodiment, the tractor 62 includes a user interface 78 communicatively coupled to the ISOBUS 68. The user interface 78 includes various controls that enable an operator to modify various parameters associated with tractor operation. For example, the user interface 78 may include buttons, dials, touch screen interface, and/or other controls. In certain embodiments, the user interface 78 may enable the operator to manually set a desired product flow rate for product distribution within the field. For example, the operator may manually select an initial product flow rate, and/or adjust the product flow rate during seeding/planting operations. Alternatively, the operator may manually adjust the product flow rate from a default product flow rate, and/or manually override an automatically selected product flow rate.

The tractor 62 includes a spatial locating or position sensing device, such as a Global Positioning System (GPS) receiver 80. The GPS receiver 80 is communicatively coupled to the ISOBUS 68 and may be used to determine the location of the tractor 62. The GPS receiver 80 may also be used to determine a ground speed of the tractor 62 and/or air cart 12. In alternative embodiments, the GPS receiver 80 may be mounted on the air cart 12 or the implement 10, and communicatively coupled to the tractor 62 via the ISOBUS 68. A display 82 is also communicatively coupled to the ISOBUS 68. The display 82 may present a variety of operational parameters to the operator, such as a map of the field, the amount of product available for distribution, the amount of remaining fuel, the speed of the engine, and so forth. Further, the display 82 is communicatively coupled to a storage device 84. For example, the display 82 may have a universal serial bus (USB) port for receiving a USB memory device. In such a configuration, the display 82 may be configured to provide data from the USB memory device to the ISOBUS 68. In other embodiments, the storage device 84 may be coupled directly to the ISOBUS 68, or the storage device 84 may be coupled to another device in the tractor 62.

The storage device 84 may store data associated with operation of the tractor 62, among other parameters. For example, the storage device 84 may contain a prescription map. The prescription map includes a layout of the field, and information that associates tractor position with product flow rate. For example, the prescription map may include instructions to provide an increased quantity of product to certain swaths of soil, and a reduced quantity of product to other swaths of soil. In this configuration, the tractor controller 64 may instruct the metering system to provide a desired product flow rate based on the prescription map, and the position of the tractor (e.g., as determined by the GPS receiver 80). The prescription map is one type of product distribution input that may be used in determining a desired product flow rate. As discussed in detail below, the desired product flow rate may be used to determine a desired air flow rate that effectively conveys product through the distribution hoses without blowing the product out of the seed trenches.

In the illustrated embodiment, the hydraulic valve 70 is used to control the amount of hydraulic fluid flowing through a hydraulic line 86 to a hydraulically controlled fan motor 88 on the air cart 12. A speed of the fan motor 88 is based on the pressure and/or the flow rate of the hydraulic fluid flowing to the fan motor 88. For example, as the pressure and/or flow rate of the hydraulic fluid increases, the speed of the fan motor 88 may increase. Conversely, as the pressure and/or flow rate of the hydraulic fluid decreases, the speed of the fan motor 88 may decrease. The fan motor 88 is used to control (e.g., produce and direct) the flow rate of the air flow that conveys product from the metering system toward product distribution devices.

The air cart 12 also includes an air cart controller 90 that is used to control various functions of the air cart 12, including the air conveyance system. The air cart controller 90 is communicatively coupled to the various systems throughout the tractor 12 via the ISOBUS 68. In addition, the air cart controller 90 is communicatively coupled to a ground speed sensor 92 and an air flow sensor 94. The ground speed sensor 92 measures a ground speed of the air cart 12, and provides the ground speed to the air cart controller 90 and/or the ISOBUS 68. Further, the air flow sensor 94 measures the flow rate (e.g., velocity, mass flow rate, volumetric flow rate, etc.) of the air flow provided by the fan motor 88, and outputs a signal indicative of the flow rate to the air cart controller 90 and/or to the ISOBUS 68.

During operation, the air cart 12 provides an indication of the ground speed of the air cart 12 to the hydraulics controller 66 (e.g., via a signal sent from the ground speed sensor 92 to the hydraulics controller 66). In certain embodiments, the hydraulics controller 66 receives an indication of the ground speed of the air cart 12 from the GPS receiver 80. The hydraulics controller 66 is also configured to receive a desired product flow rate. As previously discussed, the desired product flow rate may be manually selected by an operator, or the desired product flow rate may be provided by a prescription map. Further, the desired product flow rate may be set initially to a default value (e.g., via the prescription map). The operator may then adjust and/or override the default value to a desired product flow rate.

The hydraulics controller 66 uses the product flow rate (e.g., as determined by the ground speed of the air cart 12, and the desired product flow rate) to determine a fan motor speed. In certain embodiments, the air cart controller 90 may receive the ground speed of the air cart 12 and the desired product flow rate instead of the hydraulics controller 66. In such embodiments, the air cart controller 90 may determine the fan motor speed using the ground speed of the air cart 12 and the desired product flow rate. In other embodiments, the ground speed used to determine the fan motor speed may be the measured ground speed of the tractor 62.

After determining the desired fan motor speed, the hydraulics controller 66 sends a signal to the hydraulic valve 70 that instructs the hydraulic valve 70 to provide a desired flow rate of hydraulic fluid to the fan motor 88, thereby setting the fan motor 88 to the desired speed. The hydraulics controller 66 may use feedback from the flow sensor 94 to adjust the fan speed to provide the desired air flow rate. Further, the flow sensor 94 may provide an indication that product is blocking the conduits extending from the metering system to the implement. Such a blockage indication may be provided to the air cart controller 90 and/or the hydraulics controller 66. The air cart controller 90 and/or the hydraulics controller 66 may use the blockage indication to determine a temporary fan speed that increases the air flow rate to dislodge the blocked material. For example, the hydraulics controller 66 may instruct the valve 70 to temporarily increase the fan speed until the flow sensor 94 indicates normal flow rates through the distribution hoses.

As will be appreciated, the desired product flow rate may change during operation. For example, the desired product flow rate may change as the location of the tractor 62 changes. Therefore, the fan motor speed may change as the location of the tractor 62 changes. Further, the fan motor speed may change as the speed of the tractor 62 changes.

In certain embodiments, the fan speed may be particularly adjusted based on the ground speed of the air cart 12. For example, the operator may select a desired fan speed via the user interface 78. The hydraulics controller 66 may then adjust the desired fan speed based on the ground speed of the tractor 62 and/or the air cart 12. For example, the operator may set the desired fan speed between approximately 2500 to 3500 RPM, 3000 to 4000 RPM, and so forth. The desired fan speed may be set based on an expected ground speed of the tractor 62 and/or the air cart 12. For example, if the tractor is expected to move at a ground speed of approximately 10 kph, the fan speed may be set to approximately 3500 RPM. Accordingly, when the tractor 62 is moving at approximately 10 kph, the hydraulics controller 66 may set the speed of the fan motor 88 to approximately 3500 RPM. However, when the tractor 62 increases speed to above 10 kph, the hydraulics controller 66 may increase the speed of the fan motor 88 to a speed greater than 3500 RPM. Conversely, when the tractor 62 decreases speed to below 10 kph, the hydraulics controller 66 may set the speed of the fan motor 88 to a speed less than 3500 RPM. Changing the speed of the fan motor 88 based on the tractor 62 speed allows an appropriate amount of product to be distributed (e.g., as the tractor 62 travels at a faster speed, more product is needed to achieve a specific product flow rate, so the speed of the fan motor 88 will be increased to obtain sufficient air flow for the greater amount of product).

Because the hydraulics controller 66 and the valve 70 are mounted on the tractor 62, the hydraulic fluid flow to the fan motor 88 is directly controlled by the tractor 62. Therefore, a separate hydraulic valve or control system mounted on the air cart 12 is avoided. Thus, certain components are not duplicated in the combined system 60. Further, hydraulic fluid is not provided to the fan motor 88 unnecessarily (i.e., wasted), but only when controlled to do so. In other words, the hydraulics controller 66 on the tractor 62 does not allow a constant flow of hydraulic fluid to flow to the air cart 12, which the air cart 12 then determines how to use. Instead, the hydraulics controller 66 allows hydraulic fluid to flow directly to the fan motor 88 on the air cart 12 so that the hydraulic fluid is limited to the amount of hydraulic fluid intended to control the fan motor 88. As may be appreciated, to close the control loop, the air cart 12 provides feedback to the tractor 62. On the tractor 62, the hydraulics controller 66 uses the feedback from the air cart 12 to control the amount of hydraulic fluid that flows to the fan motor 88, and thus the air flow. By limiting the flow of hydraulic fluid to the air cart 12 to only what is to be used by the fan motor 88, energy is conserved. In other systems that do not use the combined system 60, energy may be wasted if unnecessary hydraulic fluid flows to the fan motor 88 (e.g., excess heat may be generated by hydraulic fluid flowing through a flow control valve on the air cart 12). Further, in such systems, the tractor 62 may use unnecessary horsepower to supply the unneeded hydraulic fluid. Therefore, the combined system 60 may be implemented to conserve energy.

Figure 4:
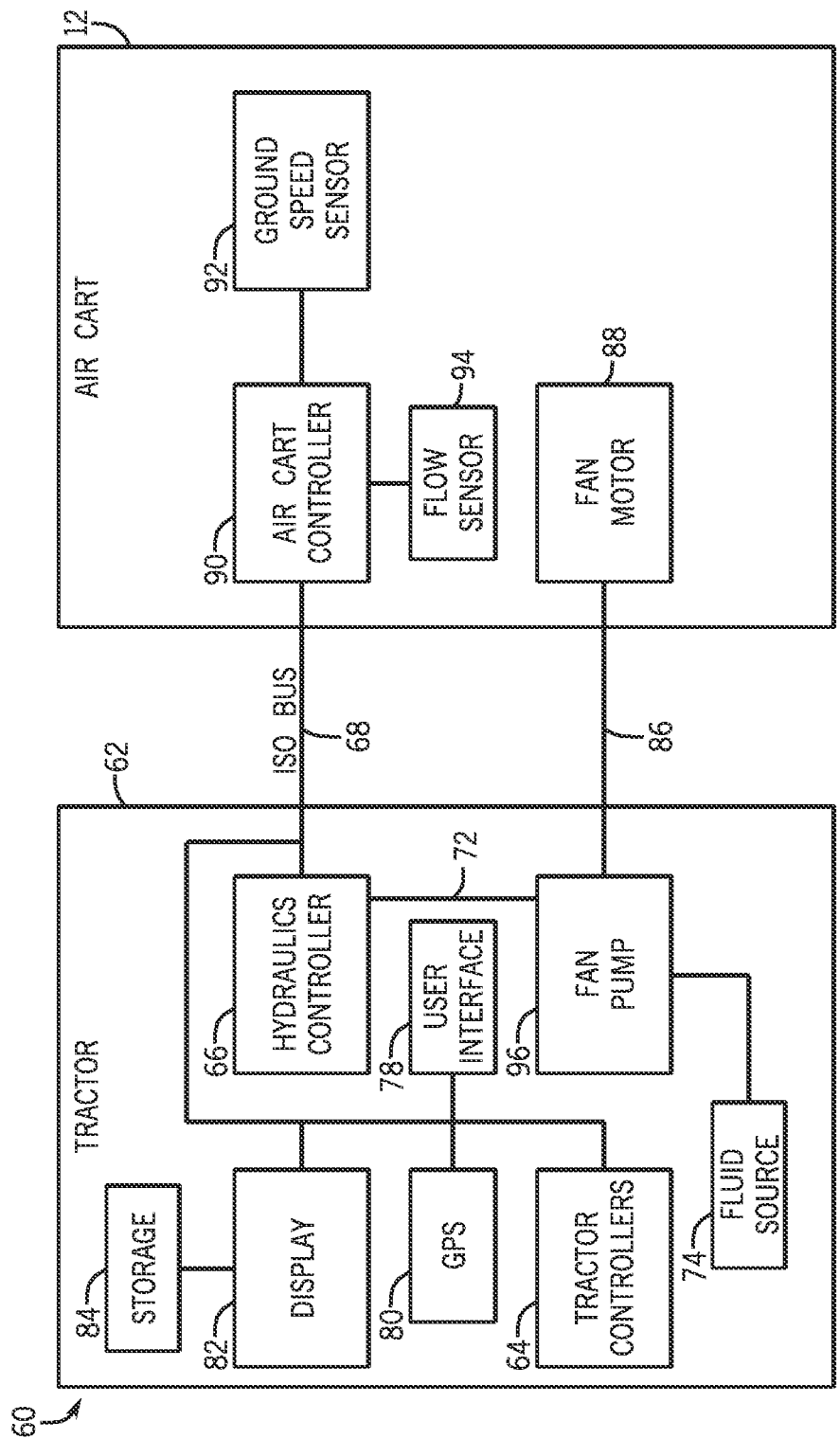
FIG. 4 is a schematic diagram of another embodiment of a system for distributing agricultural product in a field.

FIG. 4 is a schematic diagram of another embodiment of a system 60 for distributing agricultural product in a field. Similar to the system 60 described above with reference to FIG. 3, the illustrated system 60 includes a flow control device mounted on the tractor 62, and configured to control the hydraulic fluid flow rate to the fan motor 88. However, the flow control device in FIG. 4 is a hydraulic fan pump 96. Like the valve 70 of FIG. 3, the fan pump 96 is used to control the flow rate and/or pressure of hydraulic fluid flowing to the fan motor 88. The hydraulics controller 66 sends indications to the fan pump 96 to control the fan pump 96, thereby adjusting the speed of the fan motor 88. The fan pump 96 is configured to receive an indication from the hydraulics controller 66 to either increase or decrease hydraulic fluid flow rate through the fan pump 96. As such, the fan pump 96 is another example of a flow control device that may be communicatively coupled to the hydraulics controller 66 to control the flow of hydraulic fluid to the fan motor 88 based on the determined fan motor speed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for distributing an agricultural product, comprising:
   an air conveyance system having a blower configured to provide an air stream for moving metered product toward a distribution device, wherein the air conveyance system is mounted on an air cart; and
   control circuitry mounted on an agricultural vehicle, and configured to adjust a speed of the blower based at least partially on a signal indicative of a product flow rate from the air cart;
   wherein the blower comprises a hydraulically controlled fan, and the control circuitry is configured to adjust the speed of the hydraulically controlled fan via a flow control device mounted on the agricultural vehicle.

2. The system of claim 1, wherein the flow control device comprises a hydraulic valve, a hydraulic pump, or a combination thereof.

3. The system of claim 1, wherein the signal indicative of the product flow rate from the air cart comprises a first signal indicative of a ground speed of the air cart, a second signal indicative of a desired product flow rate, or a combination thereof.

4. The system of claim 2, wherein the first signal is output by a position sensing device, a ground speed sensor, or a combination thereof.

5. The system of claim 3, wherein the desired product flow rate is at least partially based on a prescription map.

6. The system of claim 3, wherein the desired product flow rate is configured to be manually input by an operator of the agricultural vehicle.

7. The system of claim 3, comprising a storage device communicatively coupled to the control circuitry, wherein the storage device is configured to output a default value for the desired product flow rate.

8. The system of claim 7, wherein the desired product flow rate is configured to be manually adjusted by an operator of the agricultural vehicle.

9. The system of claim 1, wherein the control circuitry is configured to adjust the speed of the blower based on a third signal indicative of a measured air flow rate.

10. An agricultural vehicle system comprising:
a hydraulics controller mounted on an agricultural vehicle, wherein the hydraulics controller is configured to receive a signal indicative of a product flow rate from an air cart, and to determine a desired fan motor speed based at least partially on the signal; and
a flow control device mounted on the agricultural vehicle, wherein the flow control device is communicatively coupled to the hydraulics controller, and configured to control a flow of hydraulic fluid to a fan motor on the air cart based on the desired fan motor speed.

11. The agricultural vehicle system of claim 10, wherein the signal indicative of the product flow rate comprises a first signal indicative of a ground speed of the air cart, a second signal indicative of a desired product flow rate, or a combination thereof.

12. The agricultural vehicle system of claim 11, comprising a position sensing device configured to provide the first signal indicative of the ground speed of the air cart to the hydraulics controller.

13. The agricultural vehicle system of claim 11, comprising a user interface configured to provide the second signal indicative of the desired product flow rate via manual input by an operator of the agricultural vehicle.

14. The agricultural vehicle system of claim 11, comprising a position sensing device configured to output a third signal indicative of a position of the air cart, wherein the desired fan motor speed is at least partially dependent on the third signal.

15. The agricultural vehicle system of claim 10, wherein the flow control device comprises a hydraulic valve.

16. The agricultural vehicle system of claim 10, wherein the flow control device comprises a hydraulic pump.

17. A system for distributing an agricultural product, comprising:
a hydraulics controller configured to receive a first signal indicative of a ground speed of an air cart, and a second signal indicative of a desired product flow rate, wherein the hydraulics controller is configured to determine a desired fan motor speed based at least partially on the first signal, and the second signal;
a fan motor mounted on the air cart, and configured to provide an air stream for moving metered product toward a distribution device; and
a flow control device communicatively coupled to the hydraulics controller, wherein the flow control device is configured to control a flow of hydraulic fluid to the fan motor based on the desired fan motor speed, wherein the flow control device is mounted on an agricultural vehicle configured to tow the air cart.

18. The system of claim 17, comprising a position sensing device communicatively coupled to the hydraulics controller, and configured to determine a location of the agricultural vehicle, wherein the position sensing device is configured to provide the first signal indicative of the ground speed of the air cart to the hydraulics controller.

19. The system of claim 18, wherein the position sensing device is configured to output a third signal indicative of the location of the air cart, and the desired fan motor speed is at least partially dependent on the third signal.

* * * * *